(12) United States Patent
Kusumoto et al.

(10) Patent No.: US 6,649,844 B2
(45) Date of Patent: Nov. 18, 2003

(54) COIL CONDUCTOR FOR DYNAMOELECTRIC MACHINE

(75) Inventors: Katsuhiko Kusumoto, Tokyo (JP); Shinji Nishimura, Tokyo (JP); Keiichi Komurasaki, Tokyo (JP); Akiyoshi Kariyama, Tokyo (JP); Akihiro Yamamura, Tokyo (JP); Yuji Nakahara, Tokyo (JP); Hidekazu Satake, Tokyo (JP); Yoshikazu Ugai, Tokyo (JP)

(73) Assignee: Mitsunishi Denki Kabushiki Kaisha, Tokyo (JP)

( * ) Notice: Subject to any disclaimer, the term of this patent is extended or adjusted under 35 U.S.C. 154(b) by 113 days.

(21) Appl. No.: 09/784,050

(22) Filed: Feb. 16, 2001

(65) Prior Publication Data

US 2002/0050395 A1 May 2, 2002

(30) Foreign Application Priority Data

Jul. 10, 2000 (JP) .......................... 2000-208766

(51) Int. Cl.⁷ ................................... H01B 5/08
(52) U.S. Cl. .................................... 174/128.1
(58) Field of Search .................. 174/128.1, 128.2, 174/129 R, 133 R, 110 A; 336/225

(56) References Cited

U.S. PATENT DOCUMENTS

| 389,752 A | * | 9/1888 | Lauckert | 174/129 R |
| 587,764 A | * | 8/1897 | Short | 174/129 R |
| 2,978,530 A | * | 4/1961 | Braeckman | 174/119 R |

FOREIGN PATENT DOCUMENTS

| JP | 60-139156 | 7/1985 | .......... H02K/29/00 |
| JP | 06-237560 | 8/1994 | |
| KR | 1994-0017048 | 7/1994 | |
| KR | 2000-0016123 | 3/2000 | |
| WO | WO 97/45921 | 12/1997 | |

OTHER PUBLICATIONS

Patent Abstract 60–139156.

* cited by examiner

Primary Examiner—Chau N. Nguyen
(74) Attorney, Agent, or Firm—Sughrue Mion, PLLC

(57) ABSTRACT

A coil conductor for a dynamoelectric machine which is a coil conductor to be inserted into slots of an iron core of a dynamoelectric machine, the coil conductor being made of a plurality of wire elements compression-bonded to each other by press-forming so as to have a substantially rectangular cross-section. The wire elements may be twisted by at least 360 degrees and the twisted wire elements may be further twisted. The coil conductor includes straight sections and crossover sections, providing an overall shape of a crank wound in a serpentine manner and the straight sections have different intervals that are different in accordance with the different periodical numbers n th and (n+1) th. The coil conductor for a dynamoelectric machine may further include an electrical insulating material disposed around the conductor of a square cross-sectional shape that is formed by simultaneously pressing the conductor bundle with an electrical insulating material placed therearound before press-forming.

18 Claims, 17 Drawing Sheets

COIL CONDUCTOR FOR DYNAMOELECTRIC MACHINE

REFERENCE TO RELATED APPLICATION

This application is based on Application No. 2000-208766, filed in Japan on Jul. 10, 2000, the contents of which are hereby incorporated by reference.

BACKGROUND OF THE INVENTION

This invention relates to a coil conductor for an electrical apparatus and particularly to a coil conductor for dynamoelectric machine suitable for use as a coil conductor to be inserted into slots of a dynamoelectric machine such as an electric motor and a generator.

FIG. 30 illustrates a coil conductor for a dynamoelectric machine as one example of a conventional coil conductor 101 for an electrical apparatus, which is made of a copper sheet material and has straight portions 102 to be inserted into iron core slots and crossover portions 103 connected to the end portions of the straight portions 102.

Since the conventional sheet-shaped coil conductor 101 of the dynamoelectric machine are made of a copper sheet as shown in FIG. 30, a phenomenon known as a skin effect occurs in which a deviation of current density within the conductor is generated due to the difference in inductance about the coil at a higher dynamoelectric machine frequency, so that an electric current flowing through the conductor is decreased to lower the output for the same line voltage. In order to compensate the resistance increase due to the skin effect, the position of the conductor series connected in one phase must be changed within each slot, the provision of a measure such as the braiding of the conductor is necessary, decreasing the productivity.

Also, when a multiplex winding is desired, as shown in FIG. 31, a first and a second parallel circuit 43 and 46 are first formed and, during the winding of the winding 40, an electrical connection must be established between an inner-layer winding 41 and an outer-layer winding 42 as well as between an inner-layer winding 44 and an outer-layer winding 45, resulting in the increased cost due to the decreased productivity and increased number of connection portions. Also, since the conductor has a shape cranked in a serpentine manner, redundant material is generated when cut out from a blank copper plate, degrading the yield and necessitating forming such as bending, cutting or the like, whereby the productivity is low.

SUMMARY OF THE INVENTION

Accordingly, an object of the present invention is to provide a coil conductor for a dynamoelectric machine that is small in skin effect even with a high dynamoelectric machine frequency and maintaining an output.

Another object of the present invention is to provide a coil conductor for a dynamoelectric machine that is simple in coil conductor arrangement and improved in the productivity.

Another object of the present invention is to provide a coil conductor for a dynamoelectric machine in which the electrical connection can be easily made even when the multiplex winding is used, thus preventing the cost increase.

Still another object of the present invention is to provide a coil conductor for a dynamoelectric machine in which the yield of the conductor material is not decreased and working such as bending or cutting can be made unnecessary to improve the productivity.

With the above objects in view, the present invention resides in a coil conductor for a dynamoelectric machine which is a coil conductor to be inserted into slots of an iron core of a dynamoelectric machine, said coil conductor being made of a plurality of wire elements compression-bonded to each other by press-forming so as to have a substantially rectangular cross-section.

The wire elements may be twisted by at least 360 degrees.

The wire elements, which are made of a plurality of strands twisted by at least 360 degrees, may be twisted.

The coil conductor may comprise straight sections to be inserted into said slots of said iron core and crossover sections connected between said straight sections and axially projecting from opposite end portions of said iron core, providing an overall shape of a crank wound in a serpentine manner.

The straight sections may have different intervals therebetween that are different in accordance with the different periodical numbers $\underline{n}$ th and ($\underline{n}$+1) th and said straight sections are assembled into said slots.

The straight section and said crossover section may have substantially equal cross-sectional area, and said straight section has a thickness dimension that is greater than a thickness dimension of said crossover section.

The coil conductor for a dynamoelectric machine may further comprises an electrical insulating material disposed around the conductor of a square cross-sectional shape that is formed by simultaneously pressing the conductor bundle with an electrical insulating material placed therearound before press-forming.

The electrical insulation may be provided around the conductor of a square conductor.

The plurality of square conductors may be simultaneously provided by press-forming a plurality of bundled or braided conductors.

The coil conductor may be a multi-phase winding conductor for a multi-phase a.c. current.

The coil conductor may be arranged such that wire connection ends at equal electric potential are connected prior to the press-forming and successively press-formed into a flat square bar.

The coil conductor may be arranged such that a bundle of a plurality of conductor elements are press-formed while being braided and repeating the press-forming to provide the coil.

The wire elements may be made of magnet wire.

The wire elements may be bare wires.

The wire elements may be bare wires with an oxide skin thereon.

The wire elements may be made of magnet wires and wherein said coil conductor is made by press-forming a twisted bundle of magnet wires coated with an insulating material, from which the insulating coatings are removed from portions that become connection points when wound into the coil winding.

The winding may have one end connected to the portion from which the insulating coating is removed after the press-forming and the other end connected to the portion from which the insulating coating is removed before or after the press-forming.

The coil conductor may be a three-phase conductor of which U-phase conductor is made longer than V- and W-phase conductors and wherein a common connection points are connected using said longer U-phase conductor as a shunt.

An electrically insulating coating may be provided on the lead wire portion to prevent short-circuiting at the lead wire portion.

A portion of the conductor that is not yet press-formed may be used as a lead wire.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
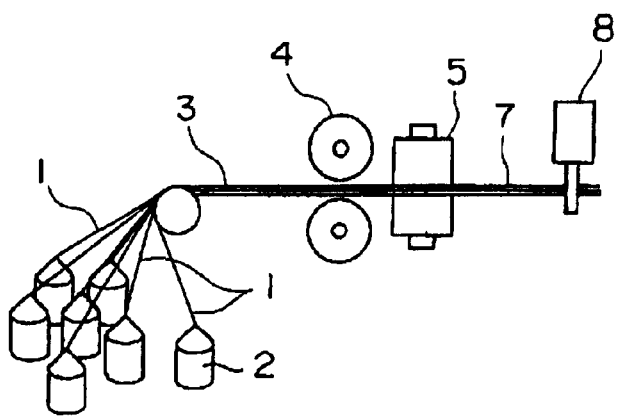
FIG. 1 is a diagrammatic view showing an apparatus for manufacturing a coil conductor for a dynamoelectric machine of the present invention.
Figure 2:
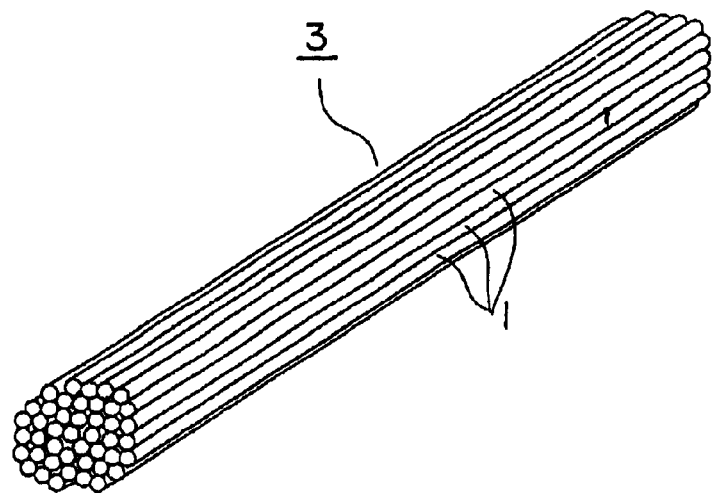
FIG. 2 is a perspective view showing a bundle of wire elements for manufacturing the coil conductor for a dynamoelectric machine of the present invention.

FIG. 1 is a view diagrammatically showing an apparatus for manufacturing a coil conductor for a dynamoelectric machine of the present invention. In manufacturing the coil conductor, a plurality of wire elements 1 are supplied from a plurality of supply coils 2 to a bundling roller to form a wire bundle 3 in which the plurality of wire elements 1 are bundled into a substantially parallel bundle. The wire elements 1 may preferably be made of copper bare conductors having an oxide skin, but conductors without any oxide skin may also be used. FIG. 2 illustrates the details of the wire bundle 3 in which a plurality of the wire elements 1 as above described are bundled together. The wire element 1 may have any cross-sectional shape, but a circular cross-section is preferable because it is easier to assemble into a compact bundle.

Figure 3:
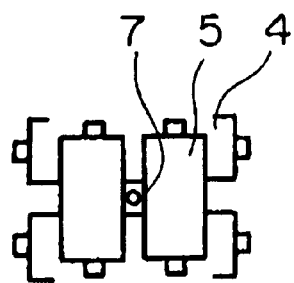
FIG. 3 is a schematic front view of the horizontal rollers and the vertical rollers of the apparatus for manufacturing a coil conductor for a dynamoelectric machine of the present invention shown in FIG. 1.
Figure 4:
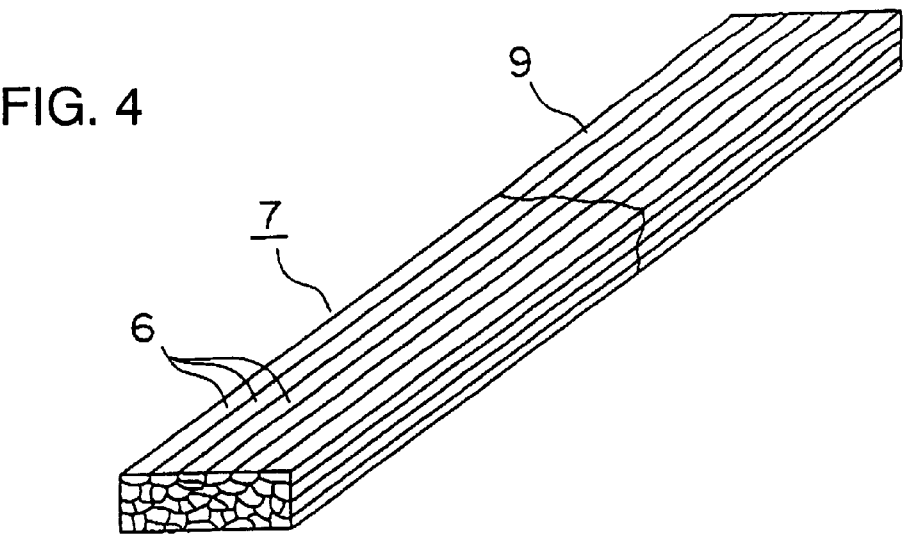
FIG. 4 is a perspective view of the coil conductor of a dynamoelectric machine press-formed with the wire elements shown in FIG. 2.

The bundle 3 of the coil conductors thus obtained is supplied to a pair of horizontal rollers 4 and a pair of vertical rollers 5 arranged as shown in FIG. 3 to pass therethrough to be press-formed, thereby to obtain a coil conductor 7 or a bundle of a substantially rectangular cross section composed of a plurality of wire elements 6 that have deformed cross sections by pressure bonding as shown in FIG. 4. In the illustrated example, the coil conductor for a dynamoelectric machine is in a shape of a sheet plate or a flat square conductor bar. In FIG. 1, the leading end of the flat square coil conductor 7 is grasped and drawn by a gripper 8. Each of the wire elements 6 of the coil conductor 7 is pressed against each other and deformed to left no clearance therebetween between the rollers 4 and 5 so that they are put together by the pressure bonding into a single conductor of a rectangular cross section. It is preferable to form an insulating coating 9 on an outer surface of the coil conductor 7 for a dynamoelectric machine thus obtained in order for the electrical insulation.

In the coil conductor 7 for a dynamoelectric machine in which a plurality of the magnet wires or bare wires having an oxide film are bundled and press-formed into the wire element 1, electric current is divided and flows through the respective wire elements 6 because the insulating coatings are provided between the press-formed wire elements 6, so that the inductance around each wire element 6 is averaged and the skin effect is reduced to improve the performance.

Also, during the press-forming, the wire elements 6 are shifted and/or deformed in the width and/or thickness directions so that the respective wire elements 6 are brought into intimate contact with each other, the wire elements 6 are positioned within the bar-shaped coil conductor 7 at random positions in the width and/or thickness directions, whereby the inductance around any one of the wire elements 6 is averaged to reduce the skin effect and improve the performance. Also, the coil conductor 7 is press-formed into a flat bar of a substantially rectangular cross-section, so that the air layers between the wire elements 6 are reduced and the space factor is improved in comparison with the winding wound with the magnet wire or the like, thus improving the performance as the winding.

Figure 30:
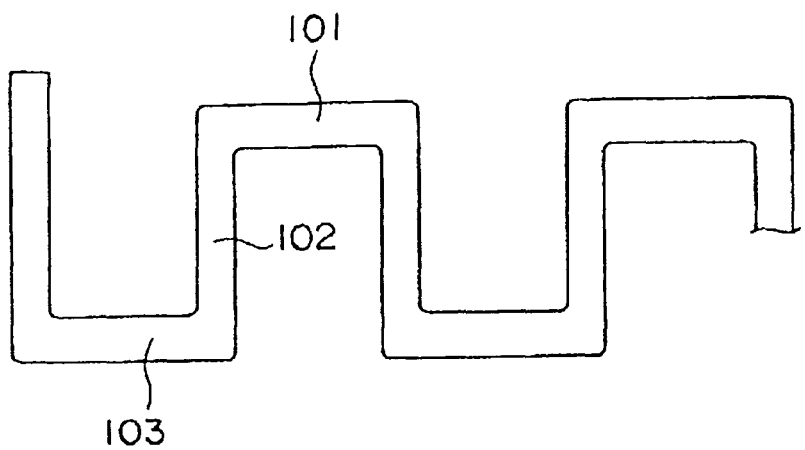
FIG. 30 is a schematic plan view showing one example of a conventional coil conductor for a dynamoelectric machine.
Figure 31:
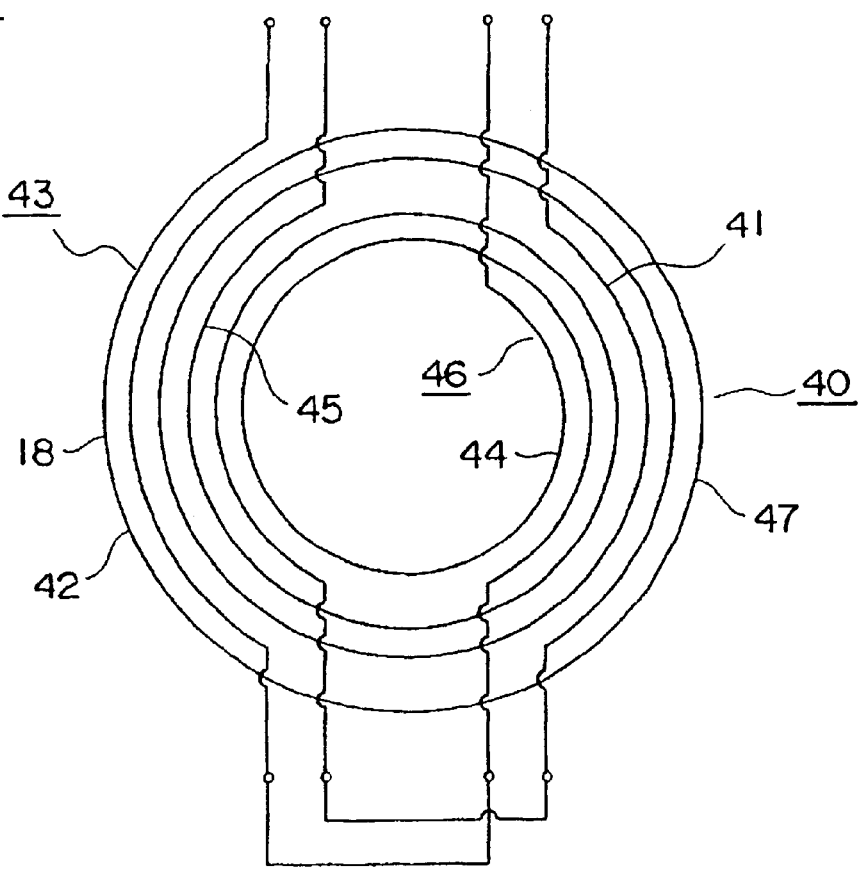
FIG. 31 is a schematic view showing the general electrical connection necessary for making a multiplex winding with the coil conductor for a dynamoelectric machine.

Further, the coil conductor 7 for a dynamoelectric machine thus manufactured is softer in comparison to the sheet conductor coil as shown in FIG. 30 and easier in inserting it into the core slots of the dynamoelectric machine, so that it is particularly suitable for use as a coil conductor for a dynamoelectric machine. Also, as compared to the manufacture of the sheet conductor coil, the various machining steps such as bending and/or cutting are unnecessary, manufacturing efficiency is improved and the yield is also improved because the conductor is manufactured from the wire elements such as magnet wires. When it is desired to decrease the height of the coil ends when the wire elements such as the magnet wires are to be wound, the coil ends must be press-formed in the axial direction after it is wound. In this case, while the conductor may be damaged due to the pressure that becomes too large when the coil end conductors are overlapped, since the coil conductors 7 are formed into a sheet conductor, the conductor alignment at the coil end is improved, allowing the winding to become small-sized.

Figure 5:
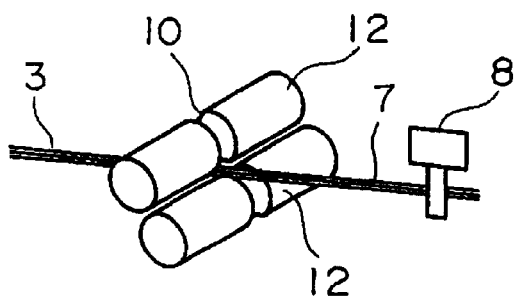
FIG. 5 is a perspective view showing the press rollers for manufacturing the coil conductor for a dynamoelectric machine of the present invention.
Figure 6:
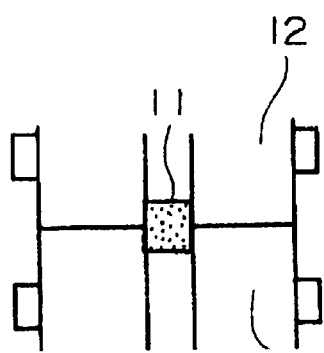
FIG. 6 is a front view of the press roller of FIG. 5.

FIG. 5 illustrates another example of a press-forming apparatus for press-forming the wire bundle 3 of the wire elements 1 shown in FIG. 2. In this example, the wire bundle 3 is passed through between a pair of rollers 12 defining a clearance 11 of a rectangular cross section as shown in FIG. 6 defined by combined circumferential grooves 10 of the rectangular cross-section and corresponding to the cross-sectional configuration to be given to the coil conductor. The bundle 3 of the wire elements is press-formed in a manner similar to that shown in FIG. 4 and is covered with the insulating coating 9 to obtain the coil conductor 7 for a dynamoelectric machine.

Figure 7:
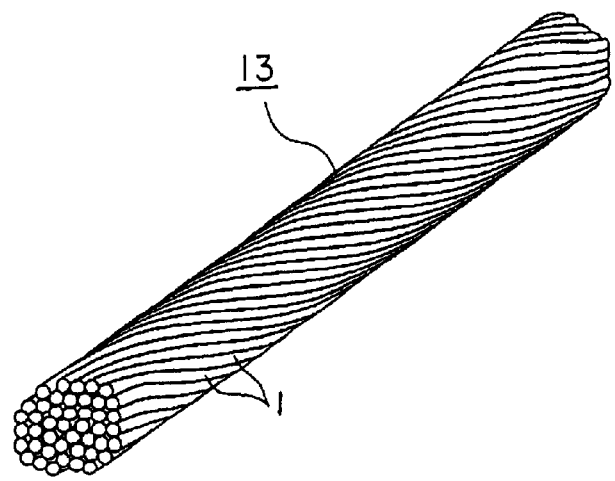
FIG. 7 is a perspective view of the bundle of the wire elements for manufacturing the coil conductor for a dynamoelectric machine of the present invention.
Figure 8:
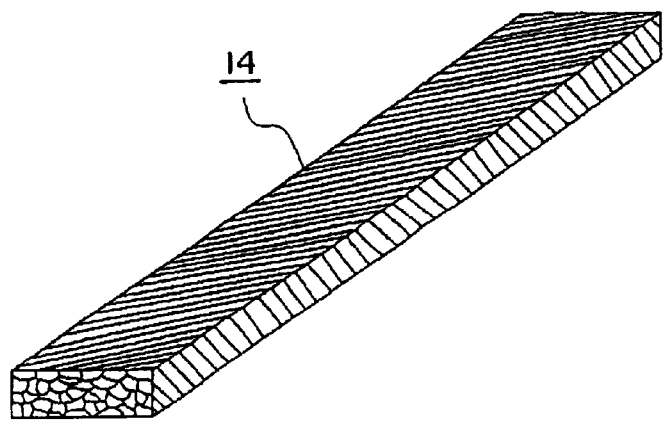
FIG. 8 is a perspective view of the coil conductor of FIG. 7.

FIG. 7 illustrates a bundle 13 of wire elements of the second embodiment of the present invention in which a plurality of the wire elements 1 are twisted by at least 360 degrees. The twisted bundle 13 of the wire elements can be manufactured by an apparatus having a hand 15 and a rotary hand 16 shown in FIG. 9. The bundle 13 may be press-formed in the manner as described in conjunction with FIGS. 1 and 3, then a coil conductor 14 for a dynamoelectric machine press-formed in a plate-like bar conductor as shown in FIG. 8 can be obtained.

Figure 9:
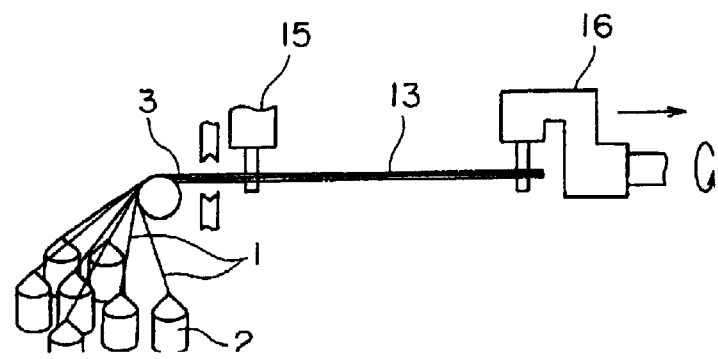
FIG. 9 is a schematic view of another apparatus for manufacturing the coil conductor for a dynamoelectric machine of the present invention.
Figure 10:
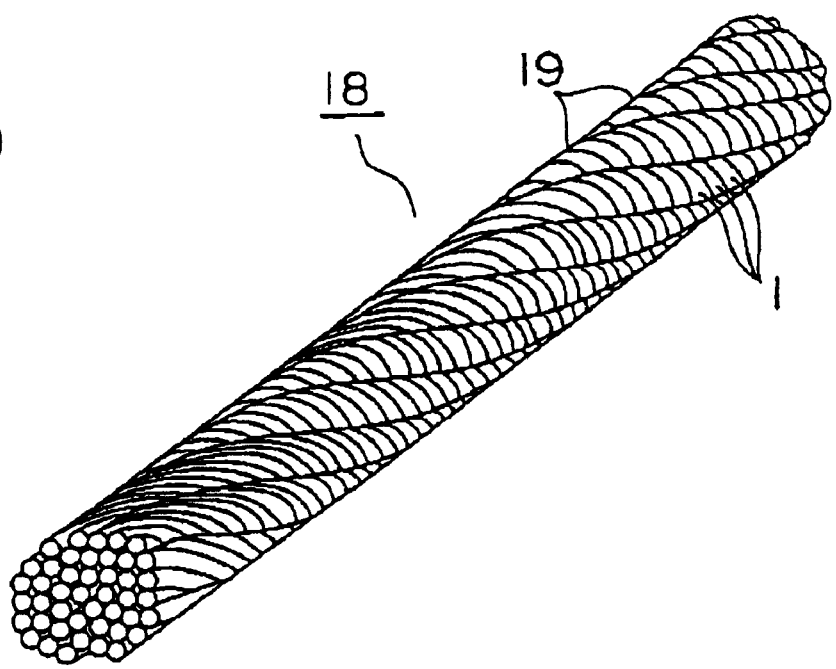
FIG. 10 is a perspective view of a bundle of the wire elements for use in manufacturing the coil conductor for a dynamoelectric machine.
Figure 11:
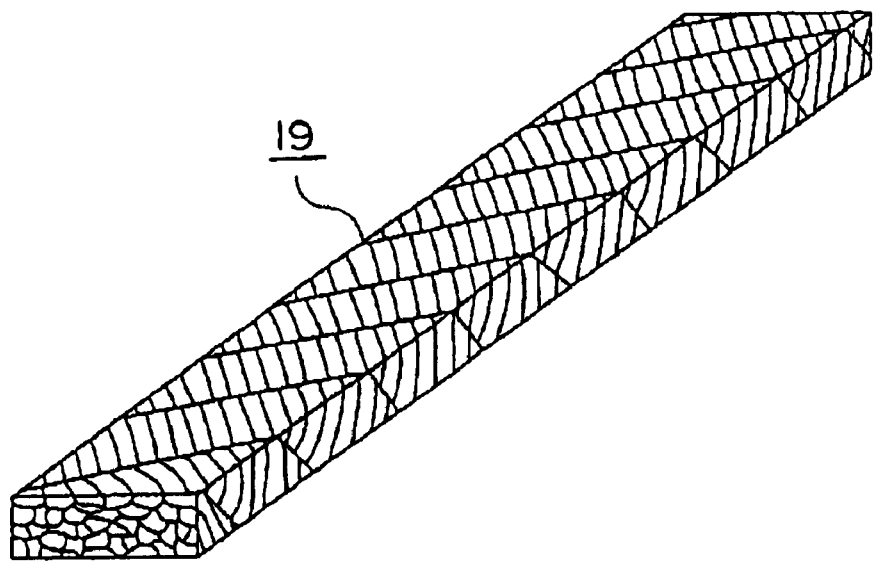
FIG. 11 is a perspective view of the coil conductor for a dynamoelectric machine press-formed with the bundle of the wire elements shown in FIG. 10.

FIG. 10 illustrates the third embodiment of the present invention, in which a bundle 18 of wire elements 1 is made of a plurality of strands 19 which are bundles of wire elements twisted in spiral by more than 360 degrees are twisted in spiral by at least 360 degrees into a bundle. This bundle 18 is made by making the strands 19 by the twisting apparatus such as that shown in FIG. 9, a plurality of the strands 19 being twisted into a bundle by a similar twisting machine. The bundle 18 of the wire elements thus obtained is then press-formed as in the manner previously described in conjunction with FIGS. 1 and 3, then a coil conductor 19 for a dynamoelectric machine press-formed into a plate-like bar conductor as shown in FIG. 11 can be obtained.

Figure 12:
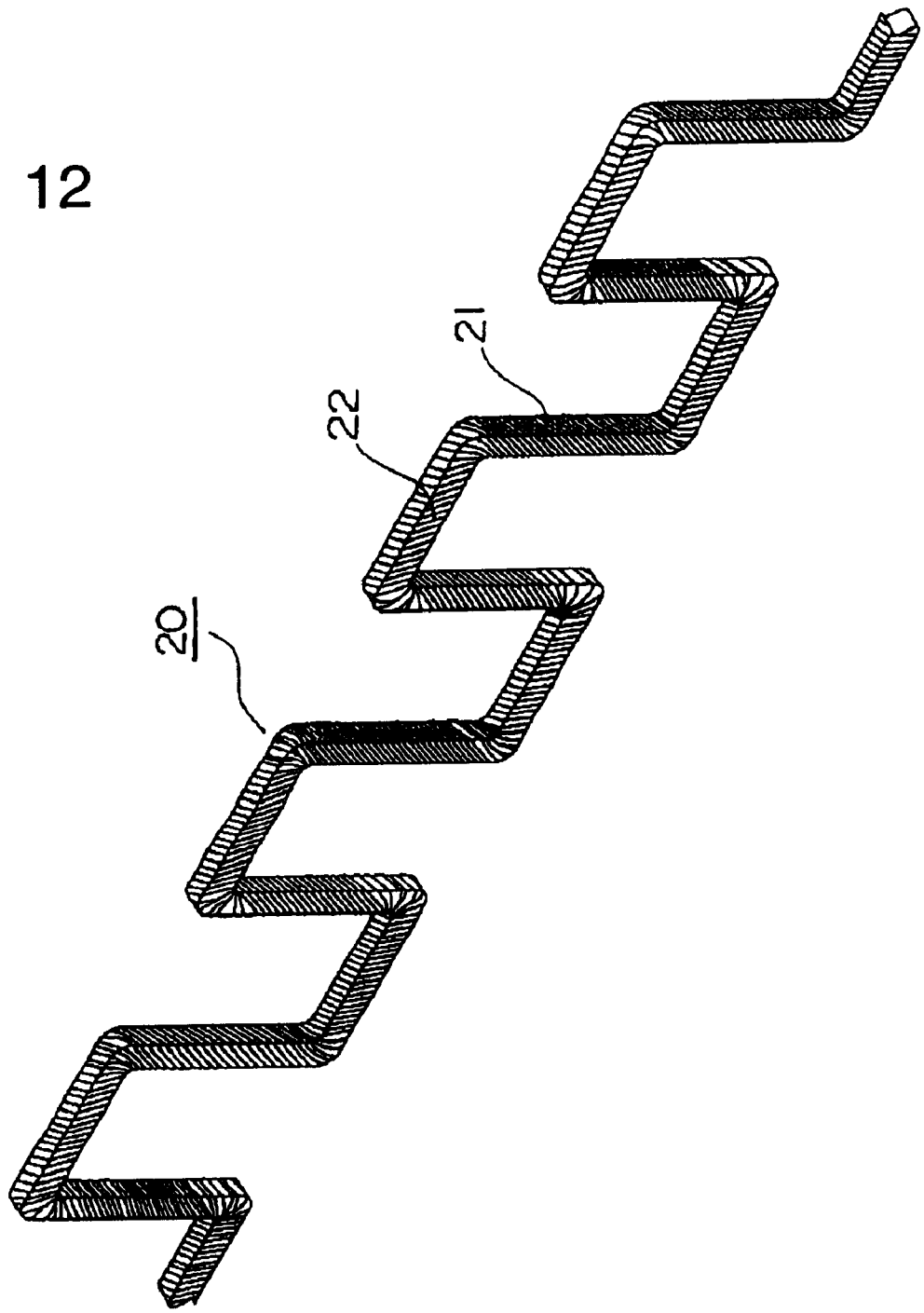
FIG. 12 is a perspective view showing another coil conductor for a dynamoelectric machine of the present invention.

FIG. 12 illustrates the coil conductor 20 for a dynamoelectric machine of the fourth embodiment of the present invention, in which the coil conductor press-formed in the plate-like square bar conductor of the first to the third embodiments are made into a general shape of a cranked serpentine configuration. The coil conductor 20 for a dynamoelectric machine comprises straight sections 21 to be inserted into slots of an unillustrated iron core and cross-over sections 22 connected between the straight sections 21 and constituting coil ends axially projecting from the opposite side portions of the unillustrated iron core. The cranked bent portions of the coil conductor 20 for a dynamoelectric machine is bent by substantially by a right angle within a plane including the major surface of the plate-like conductor.

Also, when FIG. 12 is looked at the state in which the coil conductor is expanded, the pitch of the winding in the expanded state is $Pn \cdot Pn+1$ and, when the same winding is wound in multiple times, the overlapping circumferential length in the winding becomes shorter, the pitch is of the winding from the position at which the plurality of turns are wound is made $Pn > Pn+1$, so that the coil conductor can be smoothly wound in the slots. Thus, the distance between the straight sections 21 of the winding is different from that of the n th time and that of the (n+1) th time and the straight sections 21 are assembled into the iron core slots.

Figure 13:
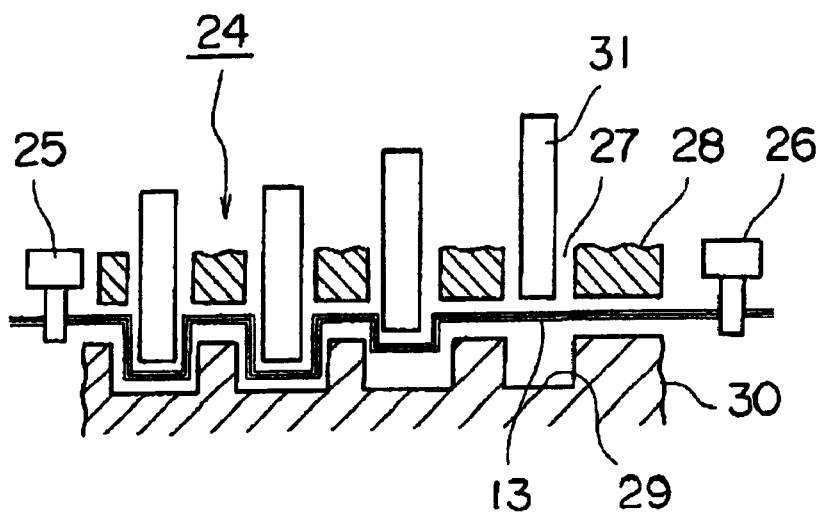
FIG. 13 is a schematic cross-sectional view of the press machine for use in manufacturing the coil conductor for a dynamoelectric machine shown in FIG. 12.
Figure 14:
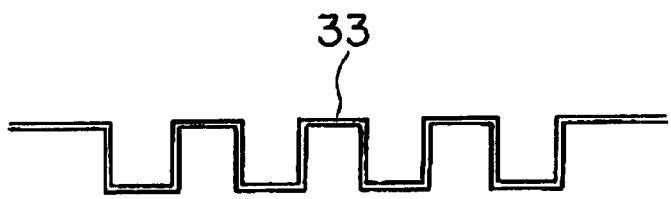
FIG. 14 is a side view of the bundle of the wire elements manufactured by the press machine shown in FIG. 13.
Figure 15:
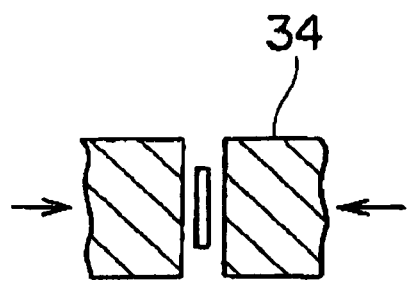
FIG. 15 is a schematic front view of the press machine for further pressing the bundle of the wire elements shown in FIG. 14.

The coil conductor 20 for a dynamoelectric machine wound in a serpentine manner in a crank-shape may be manufactured by a formation apparatus 24 as illustrated in FIG. 13 with a wire element bundle 13 shown in FIG. 7 in which the wire is twisted by the twisting device shown in FIG. 9 or with a wire element bundle 18 shown in FIG. 10. The formation apparatus 24 is an apparatus for bending and forming the wire element bundle 13 into a crank-like shape by holding the bundle 13 of the wire elements held between the hands 25 and 26 between an upper die 28 having a plurality of bores 27 and a lower die 29 having a plurality of grooves corresponding to the bores 27 to bend and form it by a plurality of punches 31 inserted under pressure into the grooves 29 through the bores 27. By this formation apparatus 24, the wire element bundle 33 bent into a crank-shape shown in FIG. 14 is press-formed and compressed in the direction of bent (the direction parallel to the plane of FIG. 14), but is not compressed in the perpendicular direction to the bend direction (the direction normal to the plane of the figure). Therefore, the wire element bundle 33 bent into a crank-shape is press-formed by a press apparatus 34 shown in FIG. 15 in the direction normal to the plane of FIG. 14 or the transverse direction in FIG. 15 to make the cross-sectional shape of the wire element bundle 33 rectangular (flat square) to obtain a coil conductor 20 for a dynamoelectric machine illustrated in FIG. 12.

Figure 16:
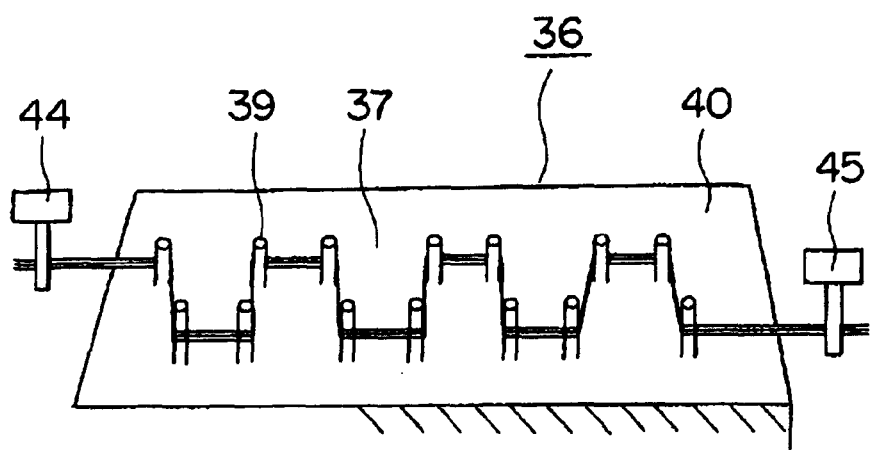
FIG. 16 is a schematic perspective view showing another press machine for manufacturing the coil conductor for a dynamoelectric machine shown in FIG. 12.
Figure 17:
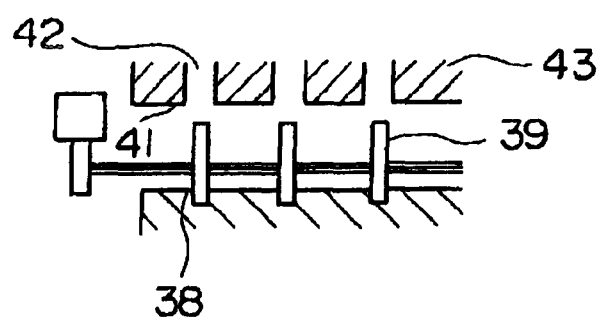
FIG. 17 is a schematic sectional view showing the press machine shown in FIG. 16.

FIGS. 16 and 17 illustrate another press apparatus 36 for forming the crank-shaped coil conductor 20 for a dynamoelectric machine as illustrated in FIG. 12. This press apparatus 36 comprises a lower die 40 having a press groove 38 having a cranked shape in plan and a U-shaped cross section and pins 39 planted at the respective corners of the press groove 39. Disposed above the lower die 40 is an upper die 43 having a press groove 41 having a plan shape corresponding to the press groove 38 and a cross section of a U-shaped cross section and an upper die 43 having pin bores 42 for receiving therein pins 39 disposed at the respective corners of the press grooves 41 and accepted.

When such the press apparatus 32 is used, the wire elements 13 shown in FIG. 8 or wire element bundle 18 shown in FIG. 10 is wound around the pins 39 of the lower die 40 of the press apparatus 36 while the bundle is being held by the suitable hands 44 and 45 to be extended between the pins 39 in a crank shape. Then the upper die 43 is lowered toward the lower die 40 to push the wire element bundle 18 wound on the pins 39 of the lower die 40 into the respective press grooves 41 and 38 formed in the upper die 43 and the lower die 40 and press-formed under a pressure into the shape of the press grooves 41 and 38, whereby the coil conductor 20 for a dynamoelectric machine bent into a crank shape and having a rectangular cross section as shown in FIG. 12 can be obtained.

Figure 18:
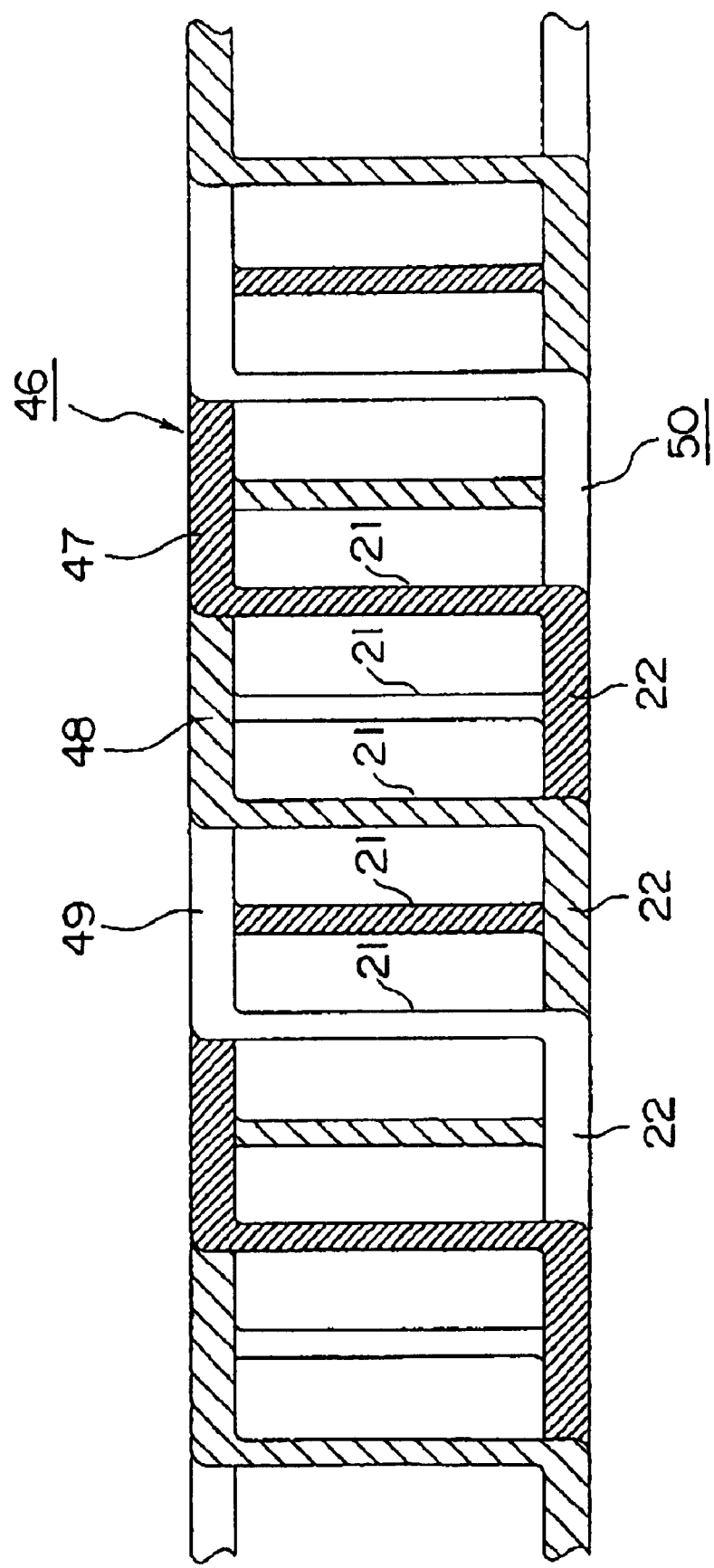
FIG. 18 is schematic plan view showing a still another coil conductor for a dynamoelectric machine of the present invention.

FIG. 18 illustrates the fifth embodiment of a coil conductor 46 for a dynamoelectric machine for three phase in which bundles of a plurality of conductors constituting polyphase conductor for a polyphase ac electric machine are braided and press-formed and disposed at each predetermined electrical angle. To manufacture such the coil conductor 46 for a dynamoelectric machine, three wire element bundles 47, 48 and 49 similar to the wire element bundle 18 for example which is bent into a crank shape in the illustrated example are prepared. The straight sections 21 of the respective wire element bundles 47, 48 and 49 are separated by the predetermined electrical angle and the respective cross over portions 22 are partially overlapped to form a wire element bundle assembly 50 having general configuration of a ladder. Then, this wire element bundle assembly 50 is press-formed by a suitable press apparatus (not shown) by applying a pressure similar to that of the previous embodiments to the wire element bundles 47, 48 and 49, thereby to pressure bonding with one another and with the wire conductors of each wire conductor bundles to form the coil conductor 46 for a dynamoelectric machine which is an integral unitary structure composed of a united wire element bundle assembly 50.

The coil conductor 46 for a dynamoelectric machine illustrated in FIG. 18 may be made by combing and arranging, as illustrated, the crank-shaped coil conductors 20 after press-formed as shown in FIG. 12 to obtain a polyphase coil conductor for a polyphase ac rotary machine.

Figure 19:
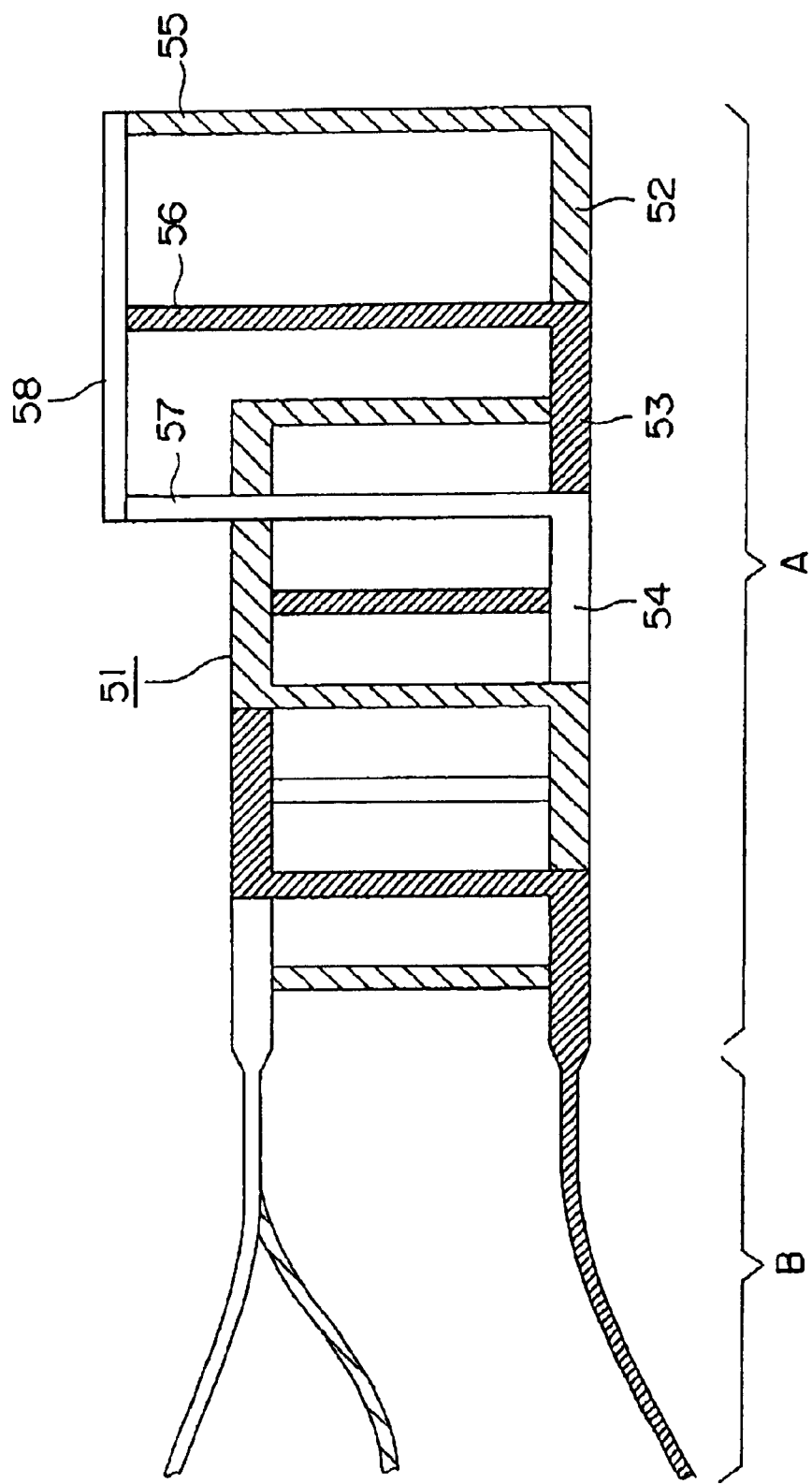
FIG. 19 is a schematic plan view showing another coil conductor for a dynamoelectric machine of the present invention.

In the coil conductor 51 for a dynamoelectric machine illustrated in FIG. 19, which is the sixth embodiment of the invention, the general arrangement is similar to the coil conductor 50 for a dynamoelectric machine shown in FIG. 18, but the connection ends 55, 56 and 57 of three wire elements 52, 53 and 54 for three-phase system are used as the press-formed tip ends, which are connected together by a conductor 58 to become the same potential ends and press-formed as previously explained successively from this equal potential ends to provide a bundle of a substantially rectangular cross section made of a plurality of wire elements pressure bonded together. In the figure, the coil conductor 51 for a dynamoelectric machine comprises a press-formed section A in which the coil conductor is press-formed and illustrated as the coil conductor having a wider width and a narrow section B in which the coil conductor is not press-formed and has a narrow width.

By connecting the connecting ends 55, 56 and 57 that are to be at the same potential as the equal potential ends by the conductor 58 or the like prior to the press-forming and by successively press-forming from these same potential ends into the flat square bar-shape, the connection of the coil conductor does not have to be achieved after the conductor is wound around the iron core (not shown) and the connection become difficult.

Figure 20:
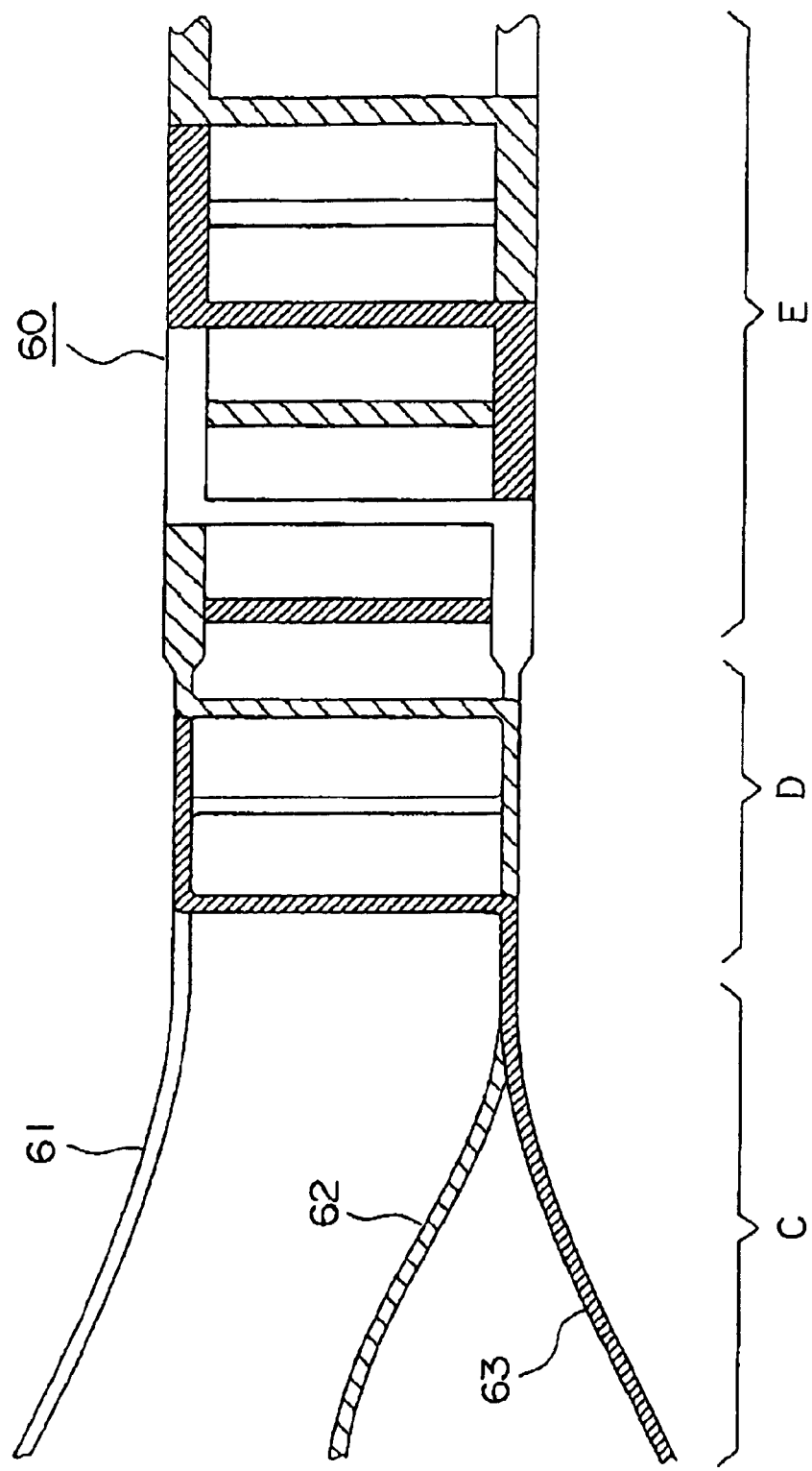
FIG. 20 is a schematic plan view showing another coil conductor for a dynamoelectric machine of the present invention.
Figure 21:
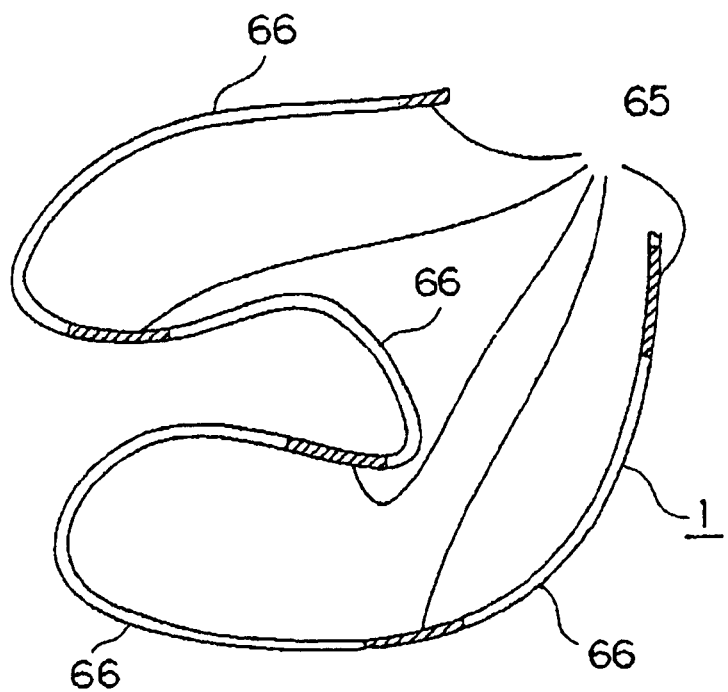
FIG. 21 is a schematic view showing the wire element from which the insulating coating is selectively removed therefrom for manufacturing the coil conductor for a dynamoelectric machine according to the present invention.

FIG. 20 illustrates, as the seventh embodiment, a manner in which the wire element bundles 61, 62 and 63 illustrated in region C of FIG. 20 are braided, bent and arranged as shown in region D of FIG. 20 and successively press-formed by a few times as shown in region E of FIG. 20 to form a coil conductor 60 for a dynamoelectric machine. Thus, by braiding and press-forming the plurality of wire elements 61, 62 and 63 and by successive pressing of several times to form the coil conductors, the coil can be manufactured by the successive pressing, so that the continuous production can be realized and the productivity is improved. Also, by combining the plurality of wire elements, the conductor position within the slots vary between the conductors connected in series to one phase, whereby the inductance around any conductor is averaged, reducing the skin effect and improving the performance.

Figure 22:
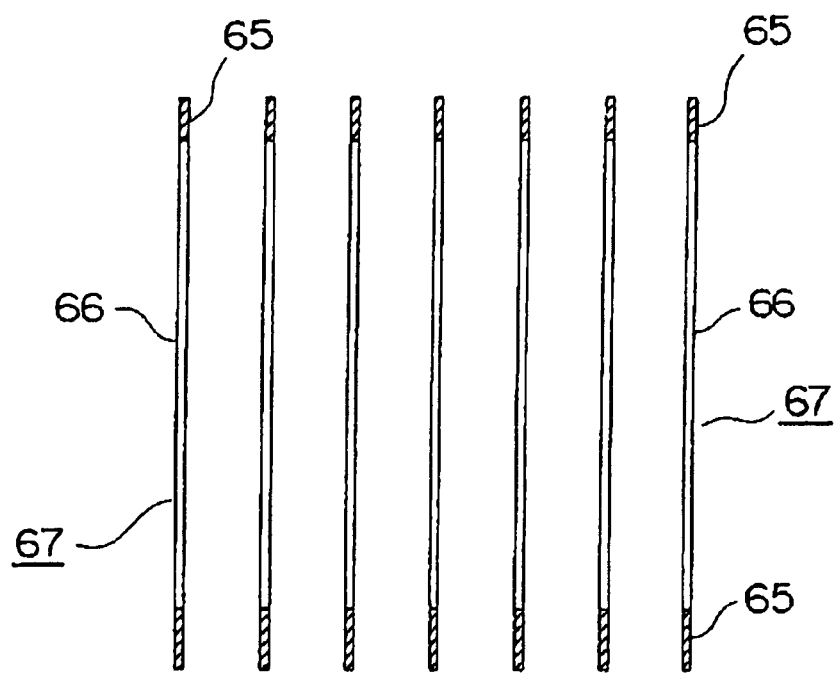
FIG. 22 is a schematic view showing the state in which the wire element shown in FIG. 21 is cut into pieces.
Figure 23:
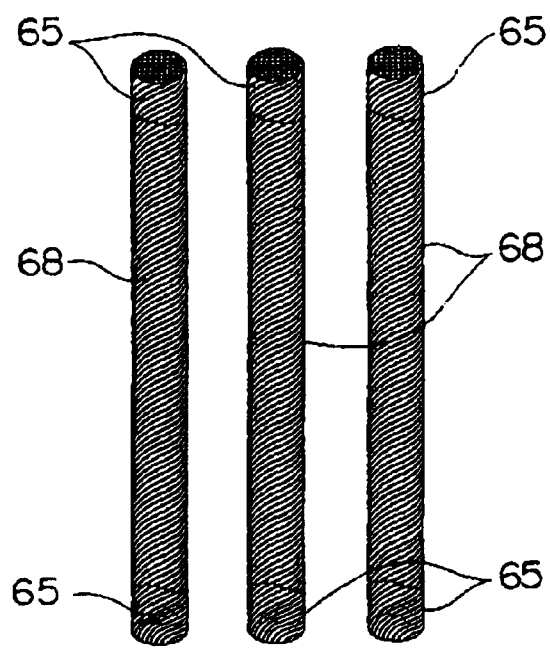
FIG. 23 is a schematic perspective view showing the state in which the wire elements shown in FIG. 22 are bundled into a bundle of the wire elements.
Figure 24:
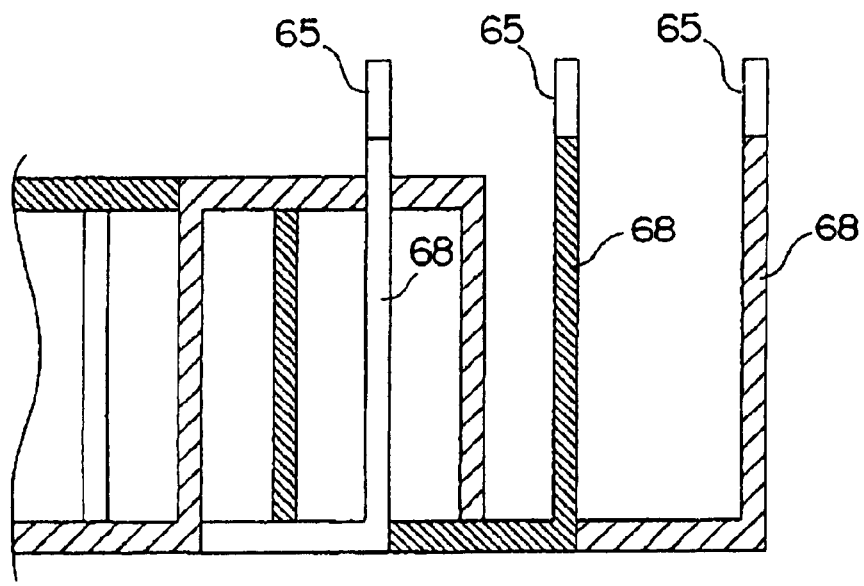
FIG. 24 is a schematic view showing the state in which the bundles of the wire elements shown in FIG. 23 are bent and assembled.
Figure 25:
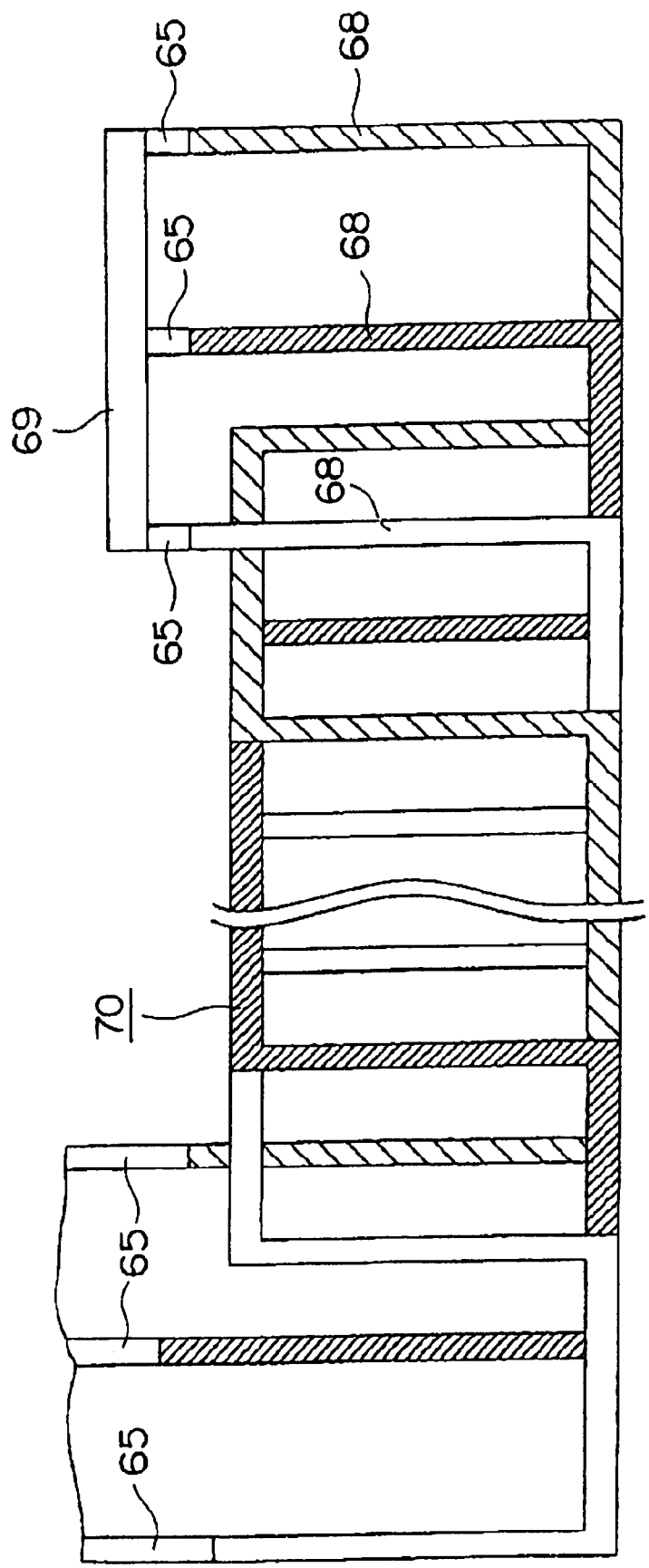
FIG. 25 is a schematic view showing the state in which the connection conductor is connected to the bundles of wire elements.

FIGS. 21 to 25 illustrates, as another method for manufacturing a coil conductor 21 of the eighth embodiment of the present invention, in which the insulating coatings on the individual magnet wires are first removed from the portion corresponding to the position to be connected when mounted to the iron core (not shown) and then press-formed into the coil conductor. That is, in FIG. 21, the insulating coatings are selectively removed from the individual wire elements coated with the insulating coating such as magnet wires at the portions that should be connected when a coil is formed to provide bare portions 65 and the coated portions 66. Then, the wire element 1 is cut at the bare portion 65 to manufacture a plurality of unit wire elements 67 each of which has bare portions 65 at the opposite ends conductor and a coated portion 66 at the remaining portion as illustrated in FIG. 22. Then, as shown in FIG. 23, these unit wire elements 67 are twisted together into bundles to make twisted wire element bundles 68 such as shown in FIG. 7, and the twisted wire element bundles 68 are bent into a crank-shape, which then are assembled with the bare portions 65 of the unit wire elements 67 of the crank-shape are arranged into an alignment. Then, as shown in FIG. 25, the bare portions 65 of the unit wire elements 67 are electrically connected together by connecting conductors 69 and press-formed by a press machine to obtain a coil conductor 70 for a dynamoelectric machine.

In this embodiment, the insulating coating of a single, long wire element 1 is selectively removed before cutting the wire element 1 and making the wire element bundle 68, but this first step may be omitted and the wire elements 1 from which the insulating coatings are removed from the opposite ends of a single wire conductor element 1 as shown in FIG. 2 to form bare portions 65 may be first assembled into a bundle and then press-formed.

Figure 26:
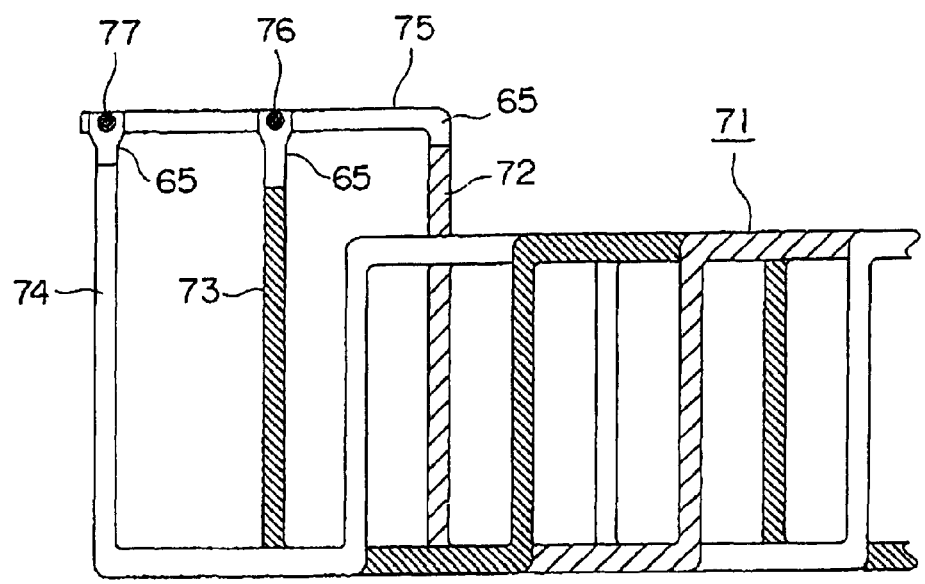
FIG. 26 is a schematic plan view showing another coil conductor for a dynamoelectric machine of the present invention.

In the 9th embodiment of the coil conductor 71 for a dynamoelectric machine illustrated in FIG. 26, the U-phase conductor 72 is made longer than the V-phase conductor 73 and the W-phase conductor 74 for three-phase, for example, the end portion of the longer conductor or the U-phase conductor 72 being used as the shunt or the connecting conductor 75, and electrically connected to the V-phase conductor 73 and the W-phase conductor 74 through common connection lines 76 and 77. While the connection conductor 75 at the end portion of the longer conductor or the U-phase conductor 72 also is press-formed In the illustrated embodiment, this portion without being press-formed and simply be assembled together is used a conductor. According to such the coil conductor 71 for a dynamoelectric machine, the structure of the common connection portion at the coil tip end becomes simple and the productivity is improved.

Figure 27:
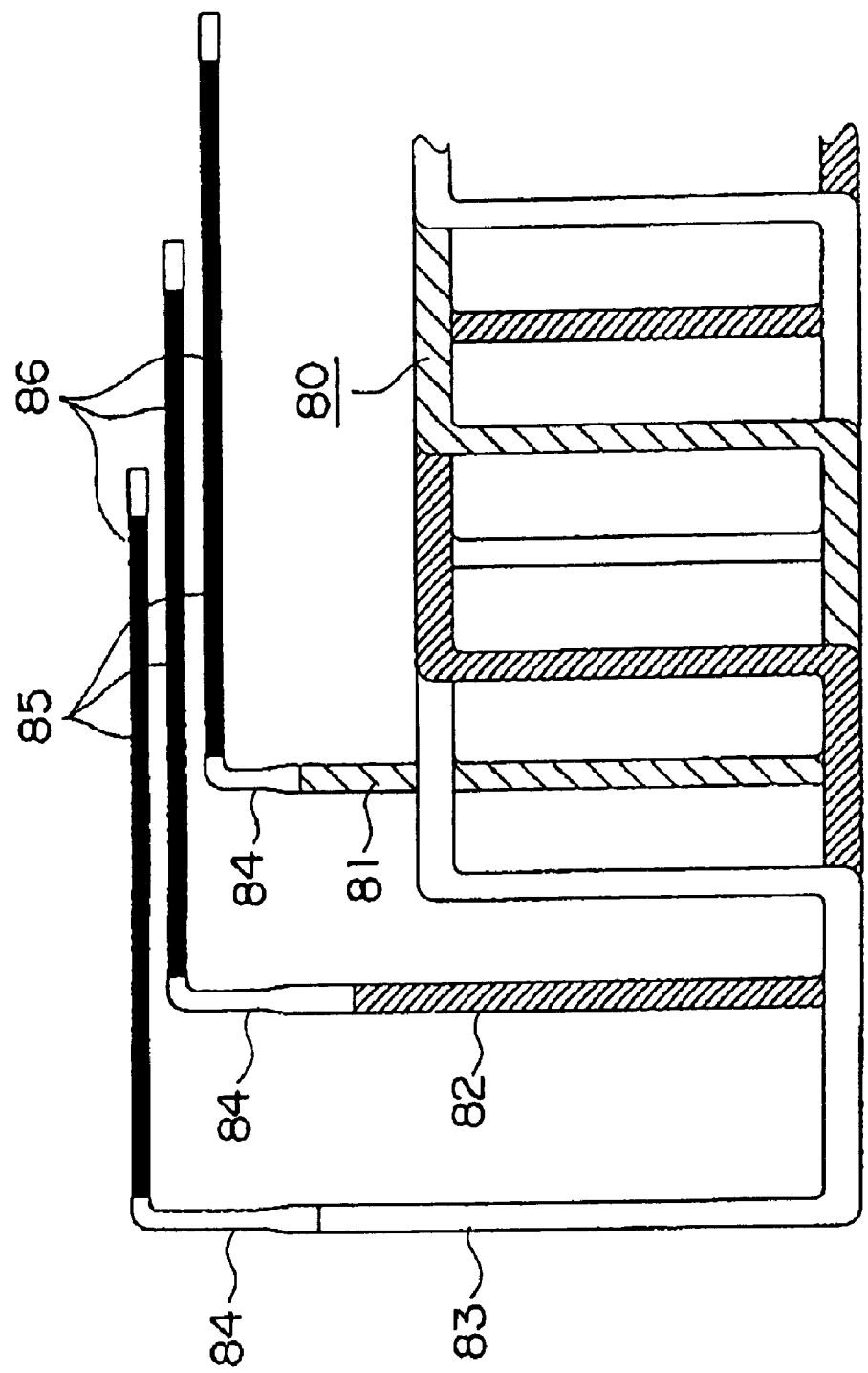
FIG. 27 is a schematic plan view showing still another coil conductor for a dynamoelectric machine of the present invention.

In the tenth embodiment of the coil conductor 80 for a dynamoelectric machine shown in FIG. 27, the end portions of the coil conductors 81 and 82 are provided with portions 84 that are not press-formed, these portions are arranged to be connectable as illustrated external circuit as a lead wire 86 having an insulating coating 85 thereon, thus preventing the short-circuiting at the lead wire 86 and permitting the wiring and connecting operation to be easily achieved.

Figure 28:
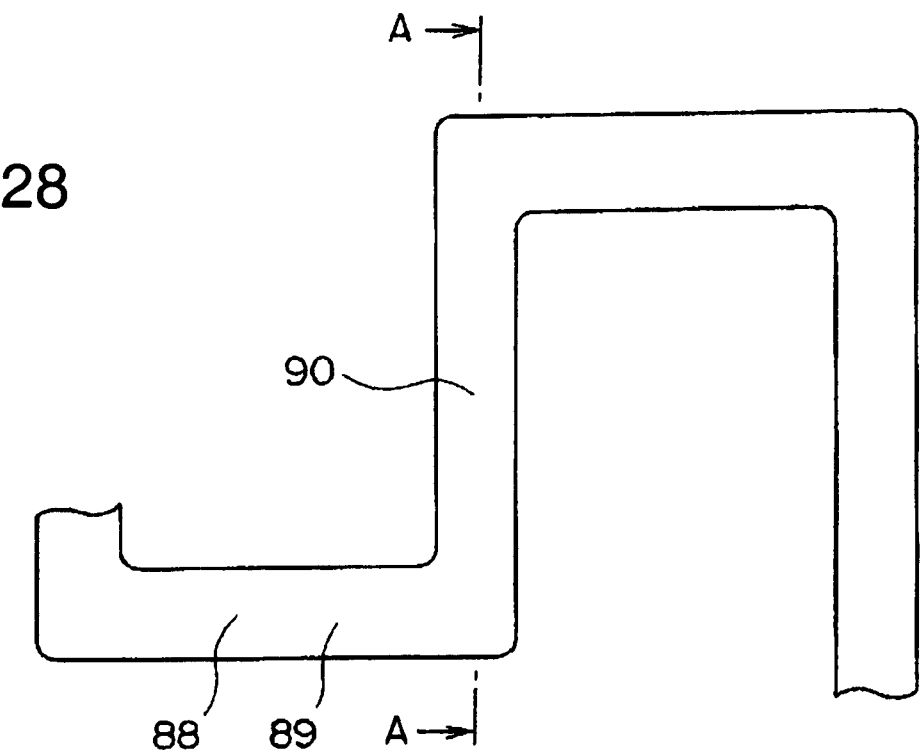
FIG. 28 is a schematic plan view showing a further coil conductor for a dynamoelectric machine of the present invention.
Figure 29:
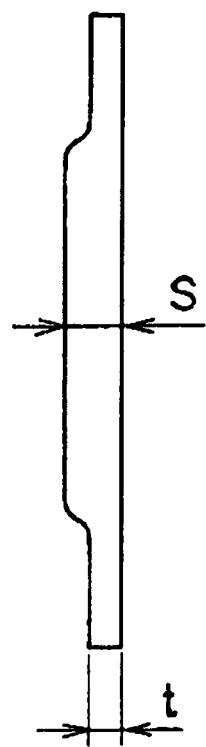
FIG. 29 is a cross-sectional view taken along line A—A of FIG. 28.

In FIGS. 28 and 29, the coil conductor 88 for a dynamoelectric machine as shown as the eleventh embodiment is bent into a crank-shape and press-formed. The crossover portion 89 of the coil conductor 88 for a dynamoelectric machine is the portion constituting the coil end of the coil that overlaps the coil conductors in another phase As has been described, according to the present invention, the coil conductor for a dynamoelectric machine is a coil conductor to be inserted into slots of an iron core of a dynamoelectric machine, said coil conductor being made of a plurality of wire elements compression-bonded to each other by press-forming so as to have a substantially rectangular cross-section.

Therefore, during the press-forming, the wire elements are shifted and/or deformed in the width and/or thickness directions so that the respective wire elements are brought into intimate contact with each other, the wire elements are positioned within the bar-shaped coil conductor at random positions the width and/or thickness directions, whereby the inductance around any one of the wire elements is averaged to reduce the skin effect and improve the performance.

Also, in the winding in which a plurality of the magnet wires or bare wires having an oxide film are bundled and press-formed into the wire element, electric current is divided and flows through the respective wire elements because the insulating coatings are provided between the press-formed wire elements, so that the inductance around each wire element is averaged and the skin effect is reduced to improve the performance. Further, by press-forming the coil conductor into a flat bar of a substantially rectangular cross-section, so that the air layers between the wire elements are reduced and the space factor is improved in comparison with the winding wound with the magnet wire or the like, thus improving the performance as the winding. Also, as compared to the manufacture of the sheet conductor coil, the various machining steps such as bending and/or cutting are unnecessary, manufacturing efficiency is improved and the yield is also improved because the conductor is manufactured from the wire elements such as magnet wires. When it is desired to decrease the height of the coil ends when the wire elements such as the magnet wires are to be wound, the coil ends must be press-formed in the axial direction after it is wound. In this case, while the conductor may be damaged due to the pressure that becomes too large when the coil end conductors are overlapped, since the coil conductors 7 are formed into a sheet conductor, the conductor alignment at the coil end is improved, allowing the winding to become small-sized.

The wire elements may be twisted by at least 360 degrees, so that, when looking at the conductor as a whole connected in series in one phase varies in position of the conductor elements constituting the conductor according to the slots, minimizing the effect of the skin effect. Also, by spirally winding the bundled conductors at least one complete turn, the conductors do not easily separate from each other, making the pressing easier.

The wire elements, which are made of a plurality of strands twisted by at least 360 degrees, may be further twisted, so that the conductors do not easily separate from each other, making it pressing easier.

The coil conductor may comprise straight sections to be inserted into said slots of said iron core and crossover sections connected between said straight sections and axially projecting from opposite end portions of said iron core, providing an overall shape of a crank wound in a serpentine manner, so that insertion into the iron core is easy.

The straight sections may have different intervals therebetween that are different in accordance with the different periodical numbers $\underline{n}$ th and $(\underline{n}+1)$ th and said straight sections are assembled into said slots, so that the pitch of the winding in the expanded state is Pn·Pn+1 and, when the same winding is wound in multiple times, the overlapping circumferential length in the winding becomes shorter, the pitch is of the winding from the position at which the plurality of turns are wound is made Pn>Pn+1, so that the coil conductor can be smoothly wound in the slots.

The straight section and said crossover section may have substantially equal cross-sectional area, and said straight section has a thickness dimension that is greater than a thickness dimension of said crossover section, so that by making the crossover section of that coil thin as compared to the straight sections preciously described since that portion constitutes the coil ends and they overlap the conductors of another phase, the coil end alignment is improved, and by making the cross-sectional area of the straight section and the crossover section substantially equal, no portion would exhibit a partial large resistance, preventing the increase in loss due to the resistance increase.

The coil conductor for a dynamoelectric machine may further comprises an electrical insulating material disposed around the conductor of a square cross-sectional shape that is formed by simultaneously pressing the conductor bundle with an electrical insulating material placed therearound before press-forming, so that by providing an electrical insulation around the conductor bundle prior to the press-forming, the insulating layers between the phases and the turns can simultaneously be formed, thus improving the productivity.

The electrical insulation may be provided around the conductor of a square conductor, so that the coil conductor for a dynamoelectric machine can be immediately inserted into the iron core.

The plurality of square conductors may be simultaneously provided by press-forming a plurality of bundled or braided conductors, so that the plurality of bundles of the plurality of conductors can be simultaneously press-formed and manufactured, improving the productivity of the winding. Also, by braiding the plurality of bundles of the plurality of conductors, the position of the conductor series connected in a single phase varies within the slots, making the inductance around any conductor is averaged, decreasing the influence of the skin effect and improving the performance.

The coil conductor may be a multi-phase winding conductor for a multi-phase a.c. current, so that by overlapping or braiding the plurality of conductor bundles of the plurality of conductors of a polyphase (three phase, for example) conductor, at a predetermined electrical angle and by pressing, the entire conductors of all phases can be simultaneously manufactured, thus improving the productivity of the coil. Further, by mounting thus-manufactured multi-layered coil to an iron core and use is as a stator, for example, the time needed for winding the coil on the iron core can be shortened.

The coil conductor may be arranged such that wire connection ends at equal electric potential are connected prior to the press-forming and successively press-formed into a flat square bar, so that by connecting the ends that are to be the same potential are connected prior to press-forming, the connection after winding on the iron core can be made unnecessary.

The coil conductor may be arranged such that a bundle of a plurality of conductor elements are press-formed while being braided and repeating the press-forming to provide the coil, so that the coil can be manufactured by a successive feed press, permitting the continuous production and improve the productivity. Also, by braiding the conductor bundles, the conductor position within the slots vary depending upon the conductors series connected in one phase, the inductance around any conductor is averaged to reduce the influence of the skin effect, thus improving the performance.

The wire elements may be made of magnet wire, so that a large skin effect can be obtained.

The wire elements may be bare wires, so that the mechanical integrity as the coil conductor is high.

The wire elements may be bare wires with an oxide skin thereon, so that the mechanical integrity as the coil conductor is high providing an easy handling as the coil conductor and a large skin effect can be obtained.

The wire elements may be made of magnet wires and wherein said coil conductor is made by press-forming a twisted bundle of magnet wires coated with an insulating material, from which the insulating coatings are removed from portions that become connection points when wound into the coil winding. Therefore, after the coil-forming, the coil is in the flat configuration, so that the individual conductor must be selected to mechanically eliminate the insulation, lowering the manufacturing efficiency and, when the chemical insulation removal is to be applied, and a strong alkalic solution is used, making the working environment not good and the facility becomes large and, on the other hand, the insulating coatings is removed from the magnet wires in the independent state beforehand at the connection portion, the above problem can be avoided, so that the productivity can be improved when the insulating coating is to be mechanically removed and the working environment can be improved and the facility can be small-sized when the insulating coating is to be chemically removed.

The winding may have one end connected to the portion from which the insulating coating is removed after the press-forming and the other end connected to the portion from which the insulating coating is removed before or after the press-forming, so that by preliminarily removing the insulating coating from the connecting portion while the magnet wires are still separated and independent, the above problem can be avoided, whereby the productivity can be improved when the insulating coating is to be mechanically removed and the working environment can be improved and the facility can be small-sized when the insulating coating is to be chemically removed.

The coil conductor may be a three-phase conductor of which U-phase conductor is made longer than V- and W-phase conductors and wherein a common connection points are connected using said longer U-phase conductor as a shunt, so that, by providing the portion that is not flat press-formed at the coil end and used as the lead wire, the connecting treatment at the coil ends is not necessary, improving the productivity.

An electrically insulating coating may be provided on the lead wire portion to prevent short-circuiting at the lead wire portion, so that the additional connection of the lead wire is not necessary.

A portion of the conductor that is not yet press-formed may be used as a lead wire, so that the a separate lead wires for the coil conductor is not necessary.

What is claimed is:

1. A coil conductor for a dynamoelectric machine which is a coil conductor to be inserted into slots of an iron core of a dynamoelectric machine, said coil conductor being made of a plurality of wire elements compression-bonded to each other by press-forming so as to have a substantially rectangular cross-section, wherein said coil conductor comprises straight sections to be inserted into said slots of said iron core and crossover sections connected between said straight sections and axially projecting from opposite end portions of said iron core, providing an overall shape of a crank wound in a serpentine manner.

2. The coil conductor for a dynamoelectric machine as claimed in claim 1, wherein said wire elements are twisted by at least 360 degrees.

3. The coil conductor for a dynamoelectric machine as claimed in claim 1, wherein said wire elements, which are made of a plurality of strands twisted by at least 360 degrees, are twisted.

4. The coil conductor for a dynamoelectric machine as claimed in claim 1, wherein said straight sections have different intervals therebetween that are different in accordance with different periodical numbers $\underline{n}$ th and $(\underline{n}+1)$ th and said straight sections are assembled into said slots.

5. The coil conductor for a dynamoelectric machine as claimed in claim 1, wherein said straight sections and said crossover sections have substantially equal cross-sectional area, and said straight sections have a thickness dimension that is greater than a thickness dimension of said crossover sections.

6. The coil conductor for a dynamoelectric machine as claimed in claim 4, comprising an electrical insulating material disposed around the coil conductor of a square cross-sectional shape that is formed by simultaneously pressing a conductor bundle with the electrical insulating material placed therearound before press-forming.

7. The coil conductor for a dynamoelectric machine as claimed in claim 1, wherein an electrical insulating material is provided around the coil conductor of a square cross-sectional shape.

8. The coil conductor for a dynamoelectric machine as claimed in claim 1, wherein a plurality of square conductors are simultaneously provided by press-forming a plurality of bundled or braided conductors.

9. The coil conductor for a dynamoelectric machine as claimed in claim 8, wherein said coil conductor is a multi-phase winding conductor for a multi-phase a.c. current.

10. The coil conductor for a dynamoelectric machine as claimed in claim 8, wherein said coil conductor is arranged such that wire connection ends at equal electric potential are connected prior to the press-forming and successively press-formed into a flat square bar.

11. The coil conductor for a dynamoelectric machine as claimed in claim 8, wherein said coil conductor is arranged such that the plurality of bundled or braided conductors is press-formed while being braided and repeating the press-forming to provide the coil conductor.

12. The coil conductor for a dynamoelectric machine as claimed in claim 1, wherein said wire elements are made of magnet wire.

13. The coil conductor for a dynamoelectric machine as claimed in claim 1, wherein said wire elements are bare wires.

14. The coil conductor for a dynamoelectric machine as claimed in claim 1, wherein said wire elements are bare wires with an oxide skin thereon.

15. A coil conductor for a dynamoelectric machine which is a coil conductor to be inserted into slots of an iron core of a dynamoelectric machine, said coil conductor being made of a plurality of wire elements compression-bonded to each other by press-forming so as to have a substantially rectangular cross-section, wherein said wire elements are made of magnet wires and wherein said coil conductor is made by press-forming a twisted bundle of magnet wires coated with an insulating material, wherein the insulating material is removed from portions of the magnet wires that become connection points when wound into a coil winding, wherein said coil conductor is a three-phase conductor of which U-phase conductor is made longer than V- and W-phase conductors and wherein common connection points are connected using said longer U-phase conductor as a shunt.

16. The coil conductor for a dynamoelectric machine as claimed in claim 15, wherein said coil winding has one end connected to the portion from which the insulating material is removed after the press-forming and the other end connected to the portion from which the insulating material is removed before or after the press-forming.

17. The coil conductor for a dynamoelectric machine as claimed in claim 15, wherein an electrically insulating coating is provided on the lead wire portion to prevent short-circuiting at the lead wire portion.

18. The coil conductor for a dynamoelectric machine as claimed in claim 15, wherein a portion of the conductor that is not yet press-formed is used as a lead wire.

* * * * *